United States Patent
Abe et al.

(10) Patent No.: US 9,108,104 B2
(45) Date of Patent: Aug. 18, 2015

(54) STORAGE MEDIUM HAVING STORED THEREIN INFORMATION PROCESSING PROGRAM, INFORMATION PROCESSING APPARATUS, INFORMATION PROCESSING SYSTEM, AND INFORMATION PROCESSING METHOD

(71) Applicant: NINTENDO CO., LTD., Kyoto (JP)

(72) Inventors: Goro Abe, Kyoto (JP); Takehiko Hosokawa, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 154 days.

(21) Appl. No.: 13/868,584

(22) Filed: Apr. 23, 2013

(65) Prior Publication Data

US 2014/0141879 A1 May 22, 2014

(30) Foreign Application Priority Data

Nov. 16, 2012 (JP) ................................. 2012-251896

(51) Int. Cl.
| | |
|---|---|
| A63F 9/24 | (2006.01) |
| A63F 13/00 | (2014.01) |
| G06F 17/00 | (2006.01) |
| G06F 19/00 | (2011.01) |
| G10H 7/00 | (2006.01) |
| A63F 13/26 | (2014.01) |
| A63F 13/814 | (2014.01) |
| A63F 13/54 | (2014.01) |

(52) U.S. Cl.
CPC ................. *A63F 13/00* (2013.01); *A63F 13/26* (2014.09); *A63F 13/54* (2014.09); *A63F 13/814* (2014.09); *G10H 7/00* (2013.01)

(58) Field of Classification Search
CPC ...................................................... A63F 13/814
USPC ............................................... 463/36, 37, 42
See application file for complete search history.

(56) References Cited

U.S. PATENT DOCUMENTS

2009/0312106 A1    12/2009  Okamura et al.
2010/0009750 A1*    1/2010  Egozy et al. .................... 463/35

FOREIGN PATENT DOCUMENTS

JP      2009-297221      12/2009

OTHER PUBLICATIONS

The Legend of Zelda: Twilight Princess, Nov. 19, 2006, instruction manual.*
The Legend of Zelda: Twilight Princess, Nov. 17, 2006, review, http://www.gamespot.com/reviews/the-legend-of-zelda-twilight-princess-review/1900-6161993/.*

* cited by examiner

*Primary Examiner* — Kevin Y Kim
(74) *Attorney, Agent, or Firm* — Nixon & Vanderhye, P.C.

(57) ABSTRACT

An image including at least a part of a virtual world is generated as a first display image, a first sound created in the virtual world is generated, and a second sound forming a part of the first sound is selected in accordance with a user operation. Then, control is performed such that the first display image is displayed on a first display apparatus. Control is performed such that the generated first sound is output from a first loudspeaker in synchronization with the first display image displayed on the first display apparatus. Control is performed such that the selected second sound is output from a second loudspeaker.

15 Claims, 8 Drawing Sheets

| VARIOUS PROGRAMS | — Pa |
| TERMINAL OPERATION DATA | — Da |
| OPERATION INPUT DATA | — Da1 |
| OBJECT DATA | — Db |
| DISPLAY POSITION DATA | — Db1 |
| PERFORMANCE INSTRUMENT DATA | — Db2 |
| COMPOSITION DATA | — Dc |
| FIRST SOUND DATA | — Dd |
| SECOND SOUND DATA | — De |
| IMAGE DATA | — Df |
| OBJECT IMAGE DATA | — Df1 |
| BACKGROUND IMAGE DATA | — Df2 |

| STREAM NUMBER | INSTRUMENT NAME | PERFORMANCE STREAM |
|---|---|---|
| 1 | GUITAR | PERFORMANCE STREAM 1 |
| 2 | PIANO | PERFORMANCE STREAM 2 |
| 3 | CELLO | PERFORMANCE STREAM 3 |
| 4 | CYMBALS | PERFORMANCE STREAM 4 |
| 5 | TIMPANI | PERFORMANCE STREAM 5 |
| 6 | TRUMPET | PERFORMANCE STREAM 6 |
| 7 | CLARINET | PERFORMANCE STREAM 7 |
| ⋮ | ⋮ | ⋮ |

STORAGE MEDIUM HAVING STORED THEREIN INFORMATION PROCESSING PROGRAM, INFORMATION PROCESSING APPARATUS, INFORMATION PROCESSING SYSTEM, AND INFORMATION PROCESSING METHOD

CROSS REFERENCE TO RELATED APPLICATION

The disclosure of Japanese Patent Application No. 2012-251896, filed on Nov. 16, 2012, is incorporated herein by reference.

FIELD

The technology shown here relates to a storage medium having stored therein an information processing program, an information processing apparatus, an information processing system, and an information processing method, and in particular, relates to a storage medium having stored therein an information processing program for, for example, outputting a sound from a loudspeaker, and an information processing apparatus, an information processing system, and an information processing method for, for example, outputting a sound from a loudspeaker.

BACKGROUND AND SUMMARY

Conventionally, there is a game apparatus that outputs the sound of performing one composition as an ensemble using a plurality of instruments. In the game apparatus, a user selects a part to be assigned to the user themselves. When the selection of the assigned part is completed, the ensemble is started. Then, the user can participate in the ensemble by performing an input operation based on the assigned part.

The game apparatus, however, can merely provide the audio output of the composition performed as an ensemble from, for example, a pair of loudspeakers provided in a monitor. Thus, even a composition performed as an ensemble may lack variety, as compared to other types of sound outputs.

Therefore, it is an object of an exemplary embodiment to provide a storage medium having stored therein an information processing program capable of a wide variety of sound outputs, and an information processing apparatus, an information processing system, and an information processing method that are capable of a wide variety of sound outputs.

To achieve the above object, the exemplary embodiment can employ, for example, the following configurations. It should be noted that it is understood that, to interpret the descriptions of the claims, the scope of the claims should be interpreted only by the descriptions of the claims. If there is a conflict between the descriptions of the claims and the descriptions of the specification, the descriptions of the claims take precedence.

An exemplary configuration of a non-transitory computer-readable storage medium having stored therein an information processing program according to the exemplary embodiment is executed by a computer of an information processing apparatus for outputting an image and a sound to a first display apparatus having a first loudspeaker and for outputting at least a sound to another apparatus having a second loudspeaker. The information processing program causes the computer to execute: generating an image including at least a part of a virtual world as a first display image; generating a first sound created in the virtual world; selecting, in accordance with a user operation, a second sound forming a part of the first sound; performing control such that the first display image is displayed on the first display apparatus; performing control such that the generated first sound is output from the first loudspeaker in synchronization with the first display image displayed on the first display apparatus; and performing control such that the selected second sound is output from the second loudspeaker.

On the basis of the above, in accordance with a user operation, it is possible to select the second sound forming a part of the first sound and listen to the selected second sound using another apparatus. This enables a wide variety of sound outputs.

In addition, in the generation of the first sound, if the second sound has been selected, the first sound may be newly generated by removing the second sound from the first sound.

On the basis of the above, it is possible to listen to a sound obtained by removing the second sound from the first sound, using the first display apparatus. This enables a wider variety of sound outputs.

In addition, in the generation of the first display image, an image in which a plurality of objects are placed in the virtual world may be generated as the first display image. The information processing program may further cause the computer to execute selecting at least one object from among the plurality of objects in accordance with a user operation. In this case, in the generation of the first sound, the first sound may be generated in accordance with the objects displayed in the first display image. In the selection of the second sound, the second sound may be selected in accordance with the at least one selected object.

On the basis of the above, the selection of at least one object from among the plurality of objects displayed on the first display apparatus provides the audio output of a sound based on the at least one selected object from the second loudspeaker. This enables the operation of selecting an object to select a sound based on the selected object and listen to the sound from the second loudspeaker.

In addition, in the generation of the first display image, an image obtained by removing the at least one selected object from the plurality of objects and placing the at least one remaining object may be generated as the first display image. In the generation of the first sound, a second sound based on the at least one selected object may be removed from the first sound based on the plurality of objects to newly generate a sound based on the at least one remaining object as the first sound.

On the basis of the above, the selection of at least one object from among the plurality of objects displayed on the first display apparatus provides from the second loudspeaker the audio output of a sound based on the at least one selected object, and also provides from the first loudspeaker the audio output of the first sound obtained by removing the sound based on the at least one selected object. This enables the operation of selecting an object to move the audio output based on the selected object from the first loudspeaker to the second loudspeaker.

In addition, the other apparatus may be a second display apparatus having a display screen. The information processing program may further cause the computer to execute: generating an image representing the at least one selected object, as a second display image; and performing control such that the second display image is displayed on the second display apparatus. In this case, in the selection of the second sound, the second sound may be selected in accordance with the at least one object displayed as the second display image.

On the basis of the above, at least one of the plurality of objects displayed on the first display apparatus is displayed on the second display apparatus, thereby providing from the second display apparatus the audio output of a sound based on the at least one displayed object. This enables the operation of selecting an image and a sound to view the selected image and listen to the selected sound, using the second display apparatus.

In addition, in the generation of the first sound, a sound of which a sound source is the at least one object displayed as the first display image may be generated as the first sound. In the selection of the second sound, a sound of which a sound source is the at least one object displayed as the second display image may be selected as the second sound.

On the basis of the above, the display of an object serving as the sound source of a sound on the second display apparatus provides from the second display apparatus the audio output of a sound of which the sound source is the displayed object. This enables the operation of selecting a sound source to view the image and listen to the sound, using the second display apparatus.

In addition, the first display apparatus may be a stationary display apparatus. The second display apparatus may be a portable display apparatus.

On the basis of the above, it is possible to display on the stationary display apparatus the virtual world in which the plurality of objects are placed, and provide from the stationary display apparatus the audio output of a sound based on the plurality of objects, while displaying on the portable display apparatus a virtual world in which the selected object is placed, and providing from the portable display apparatus the audio output of a sound based on the selected object.

In addition, the second display apparatus may include an operation input unit configured to output data based on a user operation input. In this case, the information processing program may further cause the computer to execute: acquiring the data output from the operation input unit; controlling, in accordance with the acquired data, the at least one object displayed as the second display image; and changing, in accordance with the acquired data, at least one of a volume, a tone, a step, and the number of produced sounds of the second sound.

On the basis of the above, it is possible to change the second sound of which the audio output is provided from the second display apparatus, and listen to the changed second sound.

In addition, in the generation of the first sound, a sound of performing one composition as an ensemble using a plurality of instruments in the virtual world may be generated as the first sound. In the selection of the second sound, a sound of performing the composition with at least one instrument selected from among the plurality of instruments in accordance with a user operation may be generated as the second sound. In the control of outputting the second sound, the second sound of performing the composition may be output from the second loudspeaker in synchronization with the performance of the composition output as the first sound from the first loudspeaker.

On the basis of the above, it is possible to extract the sound of playing at least one instrument from the sound of performing as an ensemble using a plurality of instruments, and listen to the extracted sound.

In addition, the information processing program may further cause the computer to execute determining, in accordance with a user operation, a position and/or a direction indicated in the virtual world displayed as the first display image. In this case, in the generation of the first sound, an entire sound created in an entirety of the virtual world displayed as the first display image may be generated as the first sound. In the selection of the second sound, on the basis of the position and/or the direction indicated in the virtual world, a sound created in a periphery of the position indicated in the virtual world and/or a sound created in a predetermined range with respect to the direction indicated in the virtual world may be generated and selected as the second sound.

On the basis of the above, it is possible to provide from the first loudspeaker the audio output of the entire sound created in the entirety of the virtual world, and also provide from the second loudspeaker the audio output of a sound based on the position and/or the direction indicated in the virtual world.

In addition, the exemplary embodiment may be carried out in the forms of an information processing apparatus and an information processing system that include units configured to perform the above operations, and an information processing method including the above operations.

On the basis of the exemplary embodiment, in accordance with a user operation, it is possible to select a sound forming a part of a particular sound to listen to the selected sound using another apparatus. This enables a wide variety of sound outputs.

These and other objects, features, aspects and advantages of the exemplary embodiments will become more apparent from the following detailed description of the exemplary embodiments when taken in conjunction with the accompanying drawings.

DETAILED DESCRIPTION OF NON-LIMITING EXAMPLE EMBODIMENTS

Figure 1:
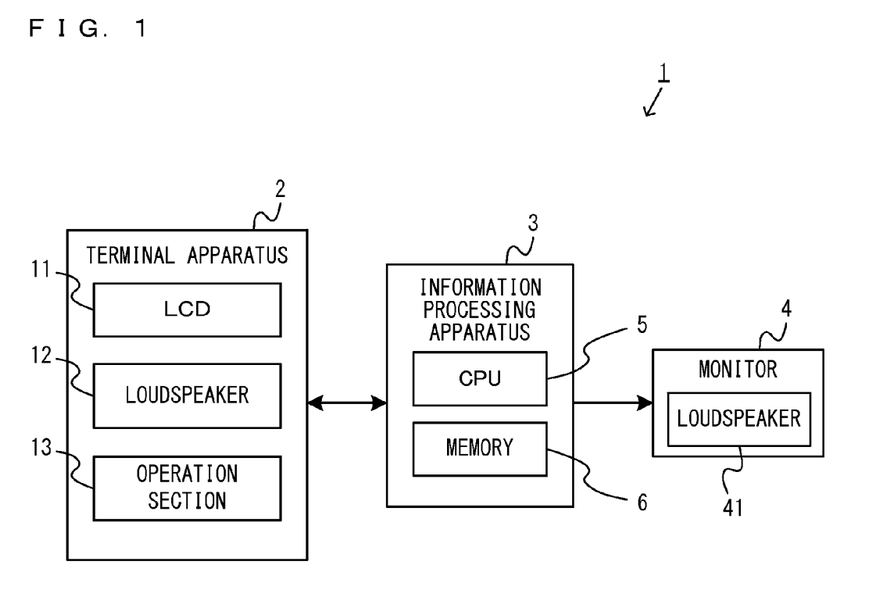
FIG. 1 is a block diagram showing a non-limiting example of an information processing system 1.

With reference to FIG. 1, a description is given of an information processing apparatus for executing an information processing program and an information processing system including the information processing apparatus, according to an exemplary embodiment. It should be noted that FIG. 1 is a block diagram showing an example of an information processing system 1 including an information processing apparatus 3. As an example, the information processing apparatus 3 is composed of a stationary game apparatus, and the information processing system 1 is composed of a game system including the stationary game apparatus.

In FIG. 1, the information processing system 1 includes a terminal apparatus 2, the information processing apparatus 3, and a monitor 4. The information processing system 1 according to the exemplary embodiment generates images (for example, game images) and displays the images on display apparatuses (the terminal apparatus 2 and the monitor 4).

In the information processing system 1, the information processing apparatus 3 executes information processing in accordance with an input to the terminal apparatus 2, and the images obtained as a result of the execution of the information processing are displayed on the terminal apparatus 2 and/or the monitor 4. As described above, in the exemplary embodiment, the information processing system 1 is configured to achieve an input function, an information processing function, and a display function by a plurality of apparatuses. It should be noted that in another exemplary embodiment, the information processing system 1 may be composed of a single information processing apparatus (for example, a portable information processing apparatus) having these functions.

The terminal apparatus 2 is an input apparatus that can be held by a user (a portable input apparatus). The terminal apparatus 2 is capable of communicating with the information processing apparatus 3. The terminal apparatus 2 transmits operation data representing the operation on the terminal apparatus 2 to the information processing apparatus 3. Further, in the exemplary embodiment, the terminal apparatus 2 includes a display section (an LCD 11), and therefore, the terminal apparatus 2 serves also as a display apparatus. When an image has been transmitted from the information processing apparatus 3, the terminal apparatus 2 displays the image on the LCD 11.

In addition, the terminal apparatus 2 includes a loudspeaker 12, and therefore, the terminal apparatus 2 serves also as a display apparatus and the audio output apparatus. The loudspeaker 12 may be, for example, a pair of stereo loudspeakers, and the output of the loudspeaker 12 may be controlled by a sound IC, which is a circuit for controlling the output of audio data. When a sound has been transmitted from the information processing apparatus 3, the terminal apparatus 2 outputs the sound from the loudspeaker 12 through the sound IC.

In addition, the terminal apparatus 2 includes an operation section 13 as an input section. As an example, the operation section 13 includes a touch panel, which detects the position of an input provided to a predetermined input surface (for example, the screen of the display section) provided in a housing, an analog stick, a directional pad, an operation button, and the like. Further, the terminal apparatus 2 may include an acceleration sensor, a gyro sensor, and the like as an input section. The acceleration sensor and the gyro sensor detect the acceleration and the angular velocity of the terminal apparatus 2 with respect to a predetermined axial direction.

The information processing apparatus 3 performs various types of information processing performed in the information processing system 1, such as the process of generating an image. In the exemplary embodiment, the information processing apparatus 3 has a CPU (control section) 5 and a memory 6. The CPU 5 executes a predetermined information processing program using the memory 6, thereby achieving various functions of the information processing apparatus 3. It should be noted that the information processing apparatus 3 may have any configuration so long as it can perform the information processing described above. In the exemplary embodiment, the information processing apparatus 3 generates images (for example, game images) and outputs the generated images to the terminal apparatus 2 and the monitor 4, which serve as display apparatuses.

The monitor 4 is an example of a display apparatus that displays a generated image and the audio output apparatus that outputs a generated sound. The monitor 4 is capable of receiving data transmitted from the information processing apparatus 3. When an image and a sound generated by the information processing apparatus 3 have been transmitted to the monitor 4, the monitor 4 displays the image, and also outputs the sound from the loudspeaker 41.

Figure 2:
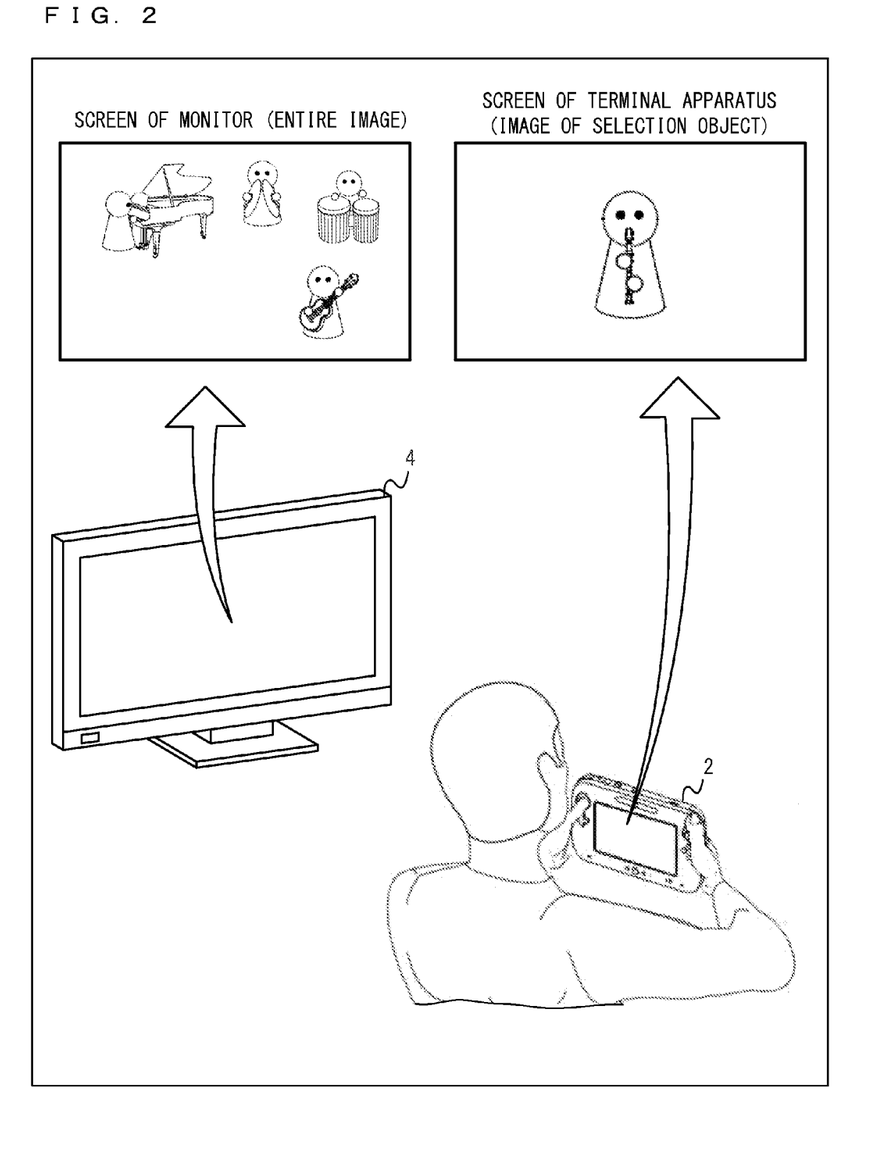
FIG. 2 is a diagram showing non-limiting examples of images displayed in the information processing system 1.
Figure 3:
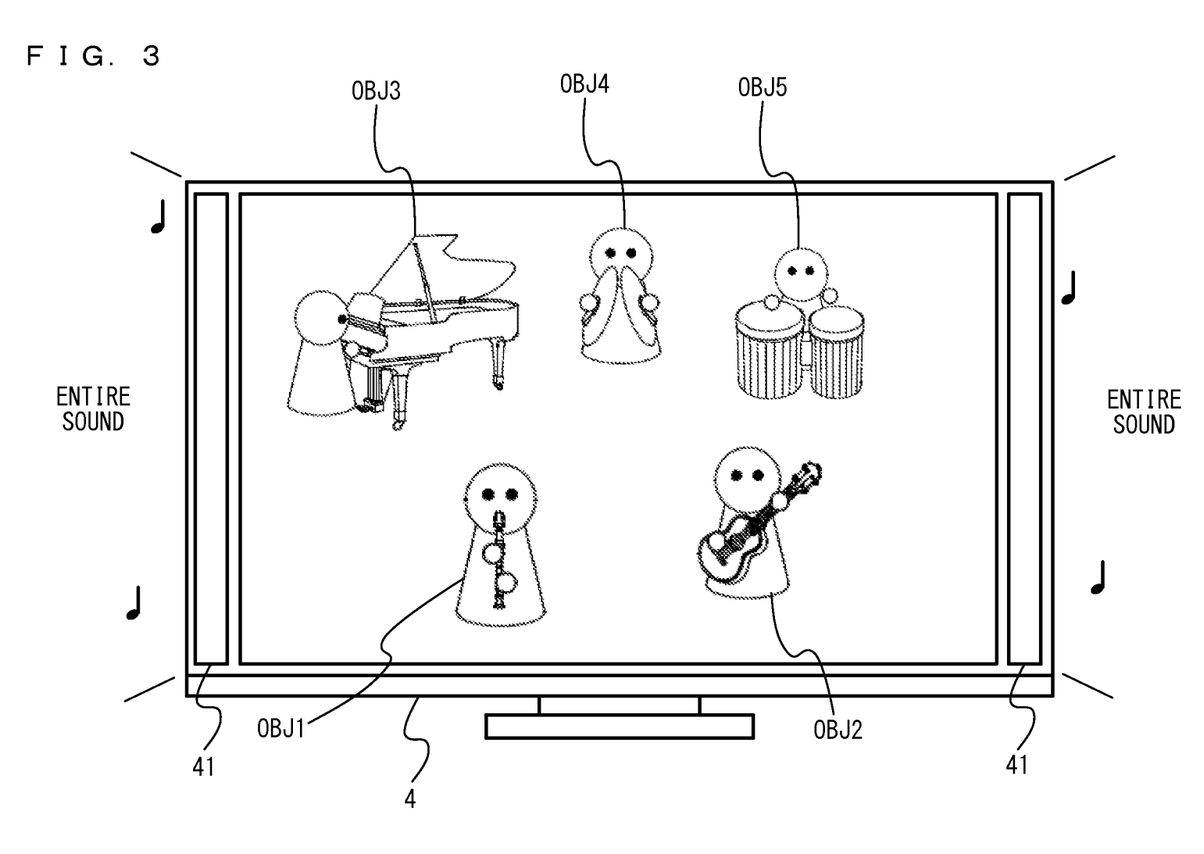
FIG. 3 is a diagram showing non-limiting examples of an entire image of a virtual world displayed on a monitor 4 and a sound output from the monitor 4.
Figure 4:
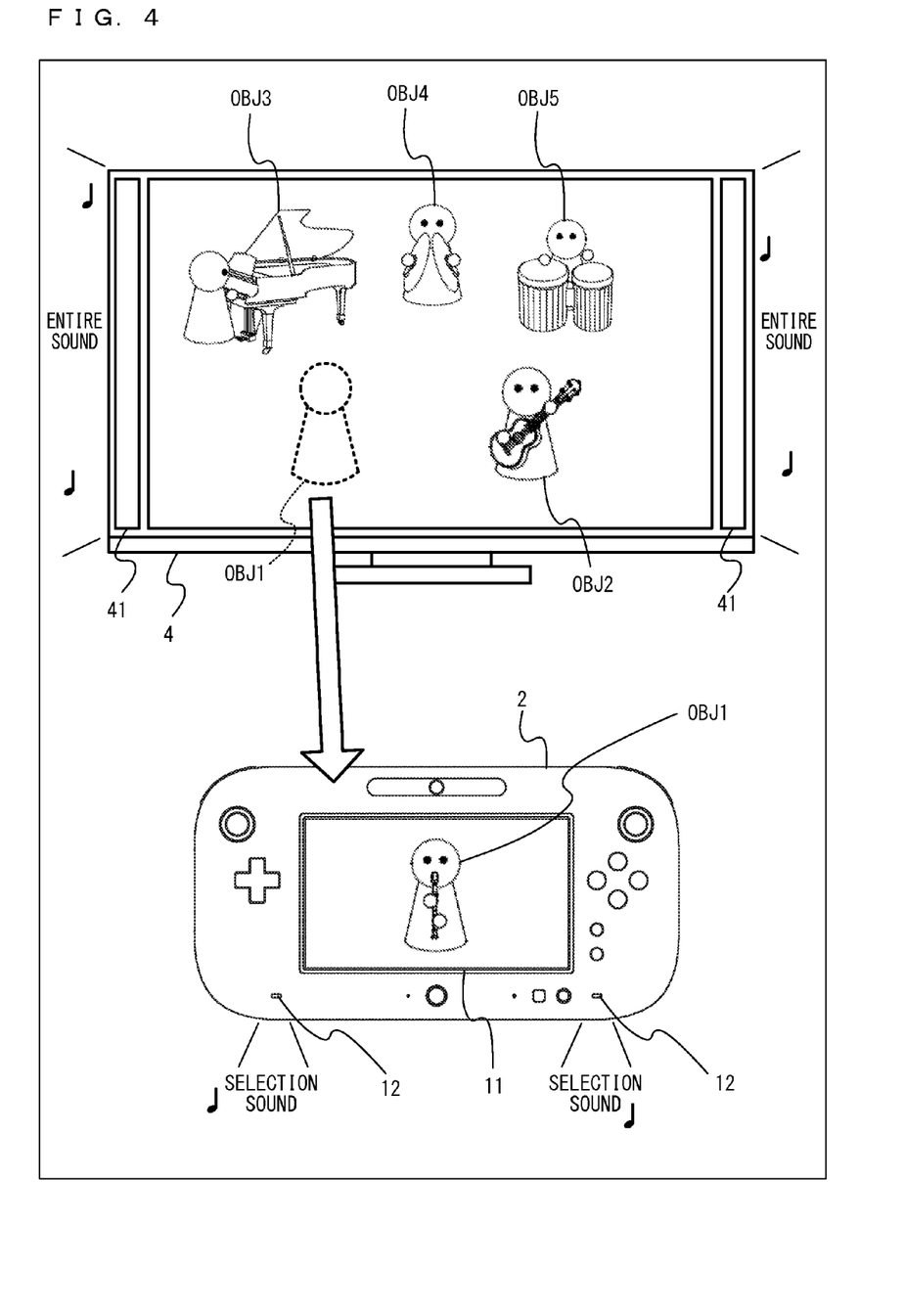
FIG. 4 is a diagram showing non-limiting examples of a display image displayed on a terminal apparatus 2 and an output sound output from the terminal apparatus 2 and non-limiting examples of a display image displayed on the monitor 4 and an output sound output from the monitor 4 when a selection object has been selected.
Figure 5:
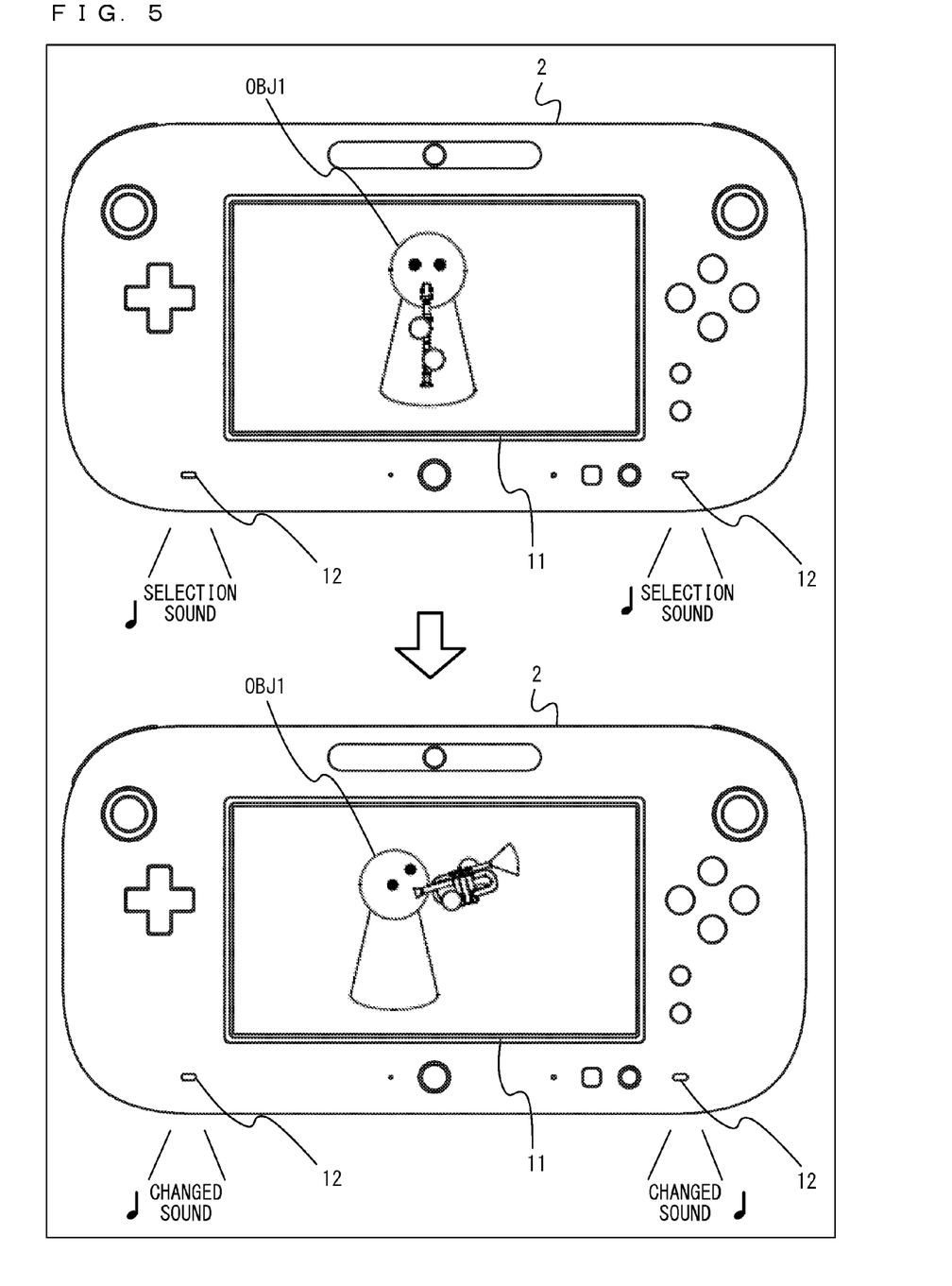
FIG. 5 is a diagram showing a non-limiting example where the selection object and the output sound are controlled by an operation on the terminal apparatus 2.

Next, with reference to FIGS. 2 through 5, a description is given of an overview of the information processing performed by the information processing apparatus 3, before the description of specific processing performed by the information processing apparatus 3. FIG. 2 is a diagram showing examples of images displayed in the information processing system 1. FIG. 3 is a diagram showing examples of an entire image of a virtual world displayed on the monitor 4 and a sound output from the monitor 4. FIG. 4 is a diagram showing examples of a display image displayed on the terminal apparatus 2 and an output sound output from the terminal apparatus 2 and examples of a display image displayed on the monitor 4 and an output sound output from the monitor 4 when a selection object has been selected. FIG. 5 is a diagram showing an example where the selection object and the output sound are controlled by an operation on the terminal apparatus 2.

As shown in FIG. 2, in the exemplary embodiment, as an example, a game image is displayed on each of the terminal apparatus 2 and the monitor 4. For example, the user operates the terminal apparatus 2 while holding it, thereby selecting an object placed in a virtual world displayed on the monitor 4. Thus, the user can cause the selected object to be displayed on the LCD 11 of the terminal apparatus 2.

As shown in FIGS. 2 and 3, for example, an entire image of the virtual world is displayed on the monitor 4. For example, a plurality of objects OBJ (five objects OBJ1 through OBJ5 in FIG. 3) are displayed in the entire image. Then, all sounds (an entire sound) created in the virtual world are output from the loudspeaker 41 of the monitor 4 such that the plurality of objects OBJ are the sound sources of the respective sounds. As an example, the plurality of objects OBJ perform the same composition using respective instruments in the virtual world, so that the audio output of the composition performed as an ensemble by the plurality of objects OBJ (that is, the sound into which all the sounds of the objects OBJ performing the same composition are combined) is provided as the entire sound.

Here, the user operates the terminal apparatus 2 (for example, using the operation section 13), and thereby can select an object OBJ from among the plurality of objects OBJ displayed on the monitor 4 (the object selected by the user will hereinafter be referred to as a "selection object"). It should be noted that one selection object may be selected, or a plurality of selection objects may be selected, from among the plurality of objects OBJ displayed on the monitor 4. For example, in the example shown in FIG. 4, the user selects the object OBJ1 displayed on the monitor 4 as a selection object. Then, if the selection object OBJ1 has been selected, the selection object OBJ1 is erased from the entire image displayed on the monitor 4, and the selection object OBJ1 is displayed on the LCD 11 of the terminal apparatus 2. The display of the selection object is thus controlled, thereby enabling a representation as if the selection object has moved from the virtual world displayed on the monitor 4 to a virtual world displayed on the terminal apparatus 2.

At this time, from the loudspeaker 12 of the terminal apparatus 2, the audio output of the sound (a selection sound) which is created in the virtual world and of which the sound source is the object displayed on the LCD 11 (that is, the selection object) is provided. For example, in the example shown in FIG. 4, the selection object OBJ1 is displayed on the LCD 11, and therefore, the audio output of the sound of the selection object OBJ1 performing the composition is provided from the loudspeaker 12. That is, the user performs the operation of selecting the selection object, thereby providing, as the selection sound from the terminal apparatus 2, the audio output of the sound forming a part of the entire sound of which the audio output has been provided from the monitor 4. Thus, if the entire sound of which the audio output is provided from the monitor 4 includes a sound that the user wishes to view and listen to in a focused manner, the user can extract the sound to provide the audio output of the extracted sound from the terminal apparatus 2. Thus, it is possible to provide an unconventional viewing and listening environment to the user.

In addition, if the selection object OBJ1 has been selected from among the plurality of objects OBJ displayed on the monitor 4, a new entire sound is generated by removing the sound of which the sound source is the selection object OBJ1, from the entire sound of which the audio output has been provided from the loudspeaker 41 before the selection of the selection object OBJ1. Then, the audio output of the new entire sound is provided from the loudspeaker 41. For example, in the example shown in FIG. 4, a sound obtained by removing the selection sound of the selection object OBJ1 performing from the entire sound generated by the plurality of objects OBJ1 through OBJ5 performing as an ensemble, that is, the sound generated by the plurality of objects OBJ2 through OBJ5 performing as an ensemble, is newly generated as the entire sound. Then, the audio output of the new entire sound is provided from the loudspeaker 41. Thus, if the entire sound of which the audio output is provided from the monitor 4 includes a sound that the user wishes to remove, the user can remove the sound to provide the audio output of the resulting entire sound from the monitor 4. Thus, it is possible to provide an unconventional viewing and listening environment to the user.

In addition, the user operates the terminal apparatus 2 with the selection object displayed on the LCD 11, and thereby can control the state, the action, and the like of the displayed selection object. For example, in the example shown in FIG. 5, the user operates the operation section 13 (for example, an L button or a R button) with the selection object displayed on the LCD 11, thereby changing the instrument played by the selection object OBJ1. Thus, the selection sound of which the audio output has been provided from the loudspeaker 12 of the terminal apparatus 2 (that is, the sound of the selection object OBJ1 playing the instrument before the change) changes to a sound based on the change of instruments and different in tone (timbre) (that is, the sound of the selection object OBJ1 playing the instrument after the change) even in the same composition. This enables the user to provide the audio output of a desired sound. It should be noted that an operation on the selection object may not only enable a change of instruments, but also enable changes in other states and other actions of the selection object. For example, the user may operate the terminal apparatus 2, thereby changing another device (for example, a device for adding a sound effect to playing or singing, such as an effect unit or an echo unit) used by the selection object. Alternatively, the performance per se of the selection object may be given in accordance with the above operation. Yet alternatively, the action of the performance of the selection object may be changed (for example, the performance strength, the performance technique, or the performance excellence of the selection object may be changed). In this case, not only the tone but also at least one of the tone, the volume, the step, and the number of produced sounds of the selection sound of which the audio output has been provided from the loudspeaker 12 changes in accordance with the above operation.

It should be noted that the above description is given using the example where the selection object is displayed on the terminal apparatus 2. Alternatively, the selection object may not need to be displayed on the terminal apparatus 2. In this case, as a first example, the selection object is not displayed on the terminal apparatus 2, and only the audio output of the selection sound is provided from the loudspeaker 12. Meanwhile, the entire image obtained by erasing the selection object is displayed on the monitor 4, and the audio output of the entire sound obtained by removing the selection sound is provided from the loudspeaker 41. As a second example, the selection object is not displayed on the terminal apparatus 2, and only the audio output of the selection sound is provided from the loudspeaker 12. Meanwhile, the entire image before the selection of the selection object is displayed as it is on the monitor 4 without erasing the selection object, and the audio output of the entire sound before the selection of the selection object is provided as it is from the loudspeaker 41. In either case, it is possible to extract a partial sound from the entire sound, and provide the audio output of the extracted sound from the terminal apparatus 2. This makes it possible to achieve a part of the above effect.

In addition, the selection object displayed on the terminal apparatus 2 may be returned to and displayed again on the monitor 4 in accordance with a predetermined operation. For example, the selection object is erased from the game image displayed on the terminal apparatus 2, and the selection object is added to the entire image on the monitor 4. In this case, a new entire sound is generated by adding the sound of which the sound source is the selection object, to the entire sound of which the audio output has been provided from the loudspeaker 41 before the additional display of the selection object in the previous entire image. Then, the audio output of the new entire sound is provided from the loudspeaker 41. Here, as described above, in accordance with an operation on the terminal apparatus 2, it is possible to change at least one of the tone, the volume, the step, and the number of produced sounds of the selection sound of the selection object performing. Consequently, the newly generated entire sound is a sound subjected to this change, as compared to the entire sound before the selection of the selection object.

In addition, the above description is given using the example where at least one of the plurality of objects placed as the sound sources is selected, thereby providing from the terminal apparatus 2 the audio output of the sound of which the sound source is the selection object. Alternatively, the audio output of the selection sound may be provided from the terminal apparatus 2 in another form. For example, a position (an indicated position) and/or a direction (an indicated direction) in the virtual world displayed on the monitor 4 are set in accordance with an operation on the terminal apparatus 2. Then, in the entire sound which is created in the virtual world and of which the audio output is provided from the monitor 4, the audio output of a sound, of the virtual world, created in the periphery of the indicated position set in the virtual world (for example, a sound from a sound source present in a predetermined range such that the indicated position is a reference), or the audio output of a sound, of the virtual world, created in the indicated direction set in the virtual world (for example, a sound from a sound source present in a predetermined range such that the indicated direction is a center), is provided from the terminal apparatus 2. Specifically, if an object placed in the virtual world displayed on the monitor 4 has been selected in accordance with an operation on the terminal apparatus 2, the audio output of a sound created in the periphery of the object, or the audio output of a sound created in a predetermined range such that the forward direction of the object is a reference, is provided from the terminal apparatus 2. Also when the indicated position and/or the indicated direction are thus set in the virtual world displayed on the monitor 4, it is possible to extract a partial sound from the entire sound of which the audio output is provided from the monitor 4, and provide the audio output of the extracted sound from the terminal apparatus 2.

Figure 6:
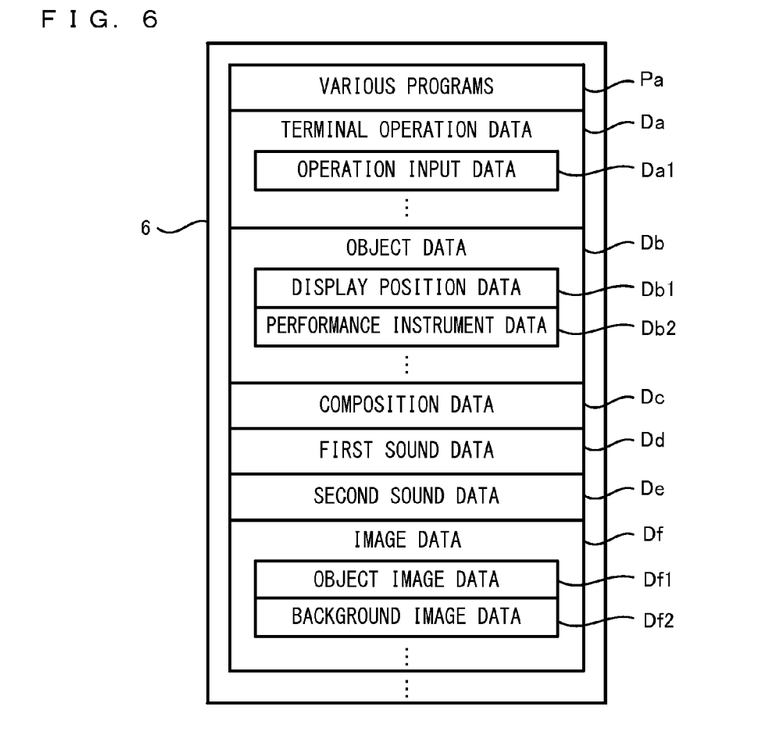
FIG. 6 is a diagram showing non-limiting examples of main data and programs stored in a memory 6 of an information processing apparatus 3.
Figure 7:
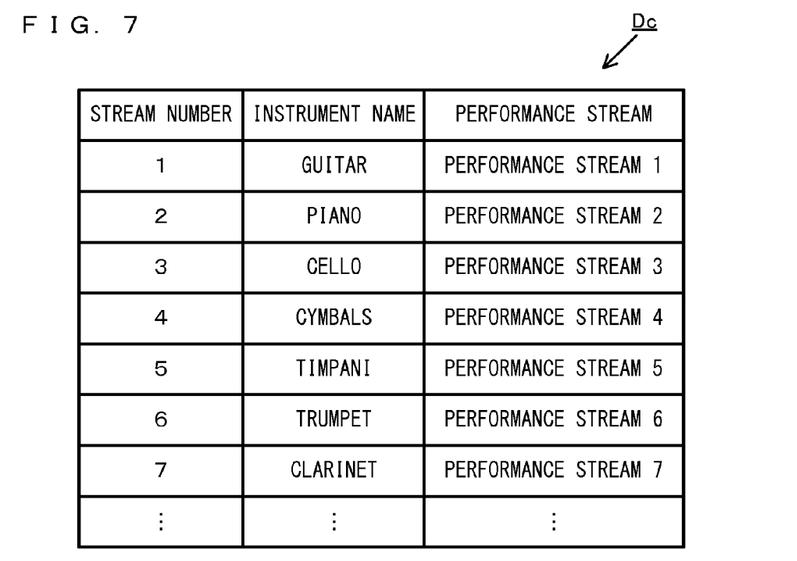
FIG. 7 is a diagram showing a non-limiting example of composition data Dc.

Next, a detailed description is given of the information processing (for example, game processing) performed by the information processing apparatus 3. It should be noted that the information processing is described below using an example where a selection object selected from among a plurality of objects displayed on the monitor 4 is displayed on the terminal apparatus 2, and the audio output of the sound of performing the same composition is provided from each of the monitor 4 and the terminal apparatus 2 (see FIGS. 2 through 5). First, with reference to FIGS. 6 and 7, a description is given of main data used in the information processing. It should be noted that FIG. 6 is a diagram showing examples of main data and programs stored in the memory 6 of the information processing apparatus 3. FIG. 7 is a diagram showing an example of composition data Dc.

As shown in FIG. 6, the following are stored in the data storage area of the memory 6: terminal operation data Da; operation object position data Db; composition data Dc; first sound data Dd; second sound data De; display image data Df; and the like. It should be noted that the memory 6 may store, as well as the data shown in FIG. 6, data and the like necessary for the information processing, such as data used in an application to be executed. Further, in the program storage area of the memory 6, various programs Pa included in the information processing program are stored.

The terminal operation data Da has stored therein a series of pieces of operation information (terminal operation data) transmitted as transmission data from the terminal apparatus 2, and is updated to the latest terminal operation data. For example, the terminal operation data Da includes operation input data Da1 and the like. The operation input data Da1 is data representing the content of the operation on the operation section 13.

The object data Db is data for setting objects to be displayed on the terminal apparatus 2 and the monitor 4. For example, the object data Db includes display position data Db1, performance instrument data Db2, and the like. The display position data Db1 is data representing the display position of each object displayed on the terminal apparatus 2 and/or the monitor 4. The performance instrument data Db2 is data representing the type of instrument and the performance method (the type of a device for adding a sound effect to playing or singing, the performance strength, the performance technique, the performance excellence, and the like) used for performance by each object displayed on the terminal apparatus 2 and/or the monitor 4.

The composition data Dc is configured in, for example, a stream format, and includes data representing a plurality of compositions of which the audio outputs are provided from the terminal apparatus 2 and the monitor 4. For example, as shown in FIG. 7, the composition data Dc is configured such that a plurality of instruments are assigned to a plurality of streams so that the performance of the same composition can be selectively controlled by specifying instruments by the stream numbers assigned to the respective instruments. That is, the composition data Dc is configured such that one stream is assigned to one part (one instrument) in a musical performance. For example, the composition data Dc is used to perform the same composition as an ensemble with a plurality of instruments, using a sound source (a DSP (digital signal processor), an ARAM (audio RAM), and the like) provided in the information processing apparatus 3. The sound source superimposes performance streams having the specified stream numbers to output a musical sound. Then, the sound source produces the musical sound having the steps, the tones, and the volumes specified on the basis of the performance parameters indicated by the CPU 5, at a specified performance tempo.

For example, the composition data Dc has a plurality of performance streams for each of the prepared compositions. Each performance stream is associated with a stream number and an instrument name. As an example, in the composition data Dc, different instruments are assigned to stream numbers, and performance streams are described so as to correspond to the stream numbers and the instruments. For example, a performance stream 1 having the instrument name "guitar" is assigned to the stream number "1", and a performance stream 2 having the instrument name "piano" is assigned to the stream number "2". Then, the indication of stream numbers and performance timing enables the sound source (the DSP and the ARAM) provided in the information processing apparatus 3 to superimpose the performance streams having the indicated stream numbers, thereby providing the audio outputs of the performance streams from the loudspeaker 12 of the terminal apparatus 2 and the loudspeaker 41 of the monitor 4 at the indicated performance timing.

It should be noted that the composition data Dc may prepare performance streams for each apparatus that provides an audio output (that is, each of the loudspeaker 12 of the terminal apparatus 2 and the loudspeaker 41 of the monitor 4). Further, the composition data Dc may be composed of data in another format. For example, the composition data Dc may be composed of sound source control data in the MIDI format. Specifically, the composition data Dc may be configured such that a plurality of instruments are assigned to a plurality of tracks (channels) termed MIDI channels, so that the performance of the same composition by a plurality of instruments can be selectively controlled by specifying instruments by the track numbers assigned to the respective instruments. Further, the volume of the sound to be output may be controlled to vary between the case where the audio output is provided from the loudspeaker 12 of the terminal apparatus 2 and the case where the audio output is provided from the loudspeaker 41 of the monitor 4. As an example, if the volume of the sound of which the audio output is provided from the loudspeaker 12 is smaller than the volume of the sound of which the audio output is provided from the loudspeaker 41, the musical sound may be produced such that the volume of the sound of which the audio output is provided from the loudspeaker 12 is predetermined times (for example, twice) the volume of the sound of which the audio output is provided from the loudspeaker 41.

The first sound data Dd is data representing a first sound (a monitor game sound) of which the audio output is provided from the loudspeaker 41 of the monitor 4, and is data representing the performance parameters for specifying the stream numbers, the steps, the tones, the volumes, and the like of the performance streams of which the audio outputs are to be provided as the first sound. The second sound data De is data representing a second sound (a terminal apparatus game sound) of which the audio output is provided from the loudspeaker 12 of the terminal apparatus 2, and is data representing the performance parameters for specifying the stream numbers, the steps, the tones, the volumes, and the like of the performance streams of which the audio outputs are to be provided as the second sound, the performance timing of each performance stream, and the like.

The image data Df includes object image data Df1, background image data Df2, and the like. The object image data Df1 is data for placing objects in a virtual world to generate a game image. The background image data Df2 is data for placing a background in a virtual world to generate a game image.

Figure 8:
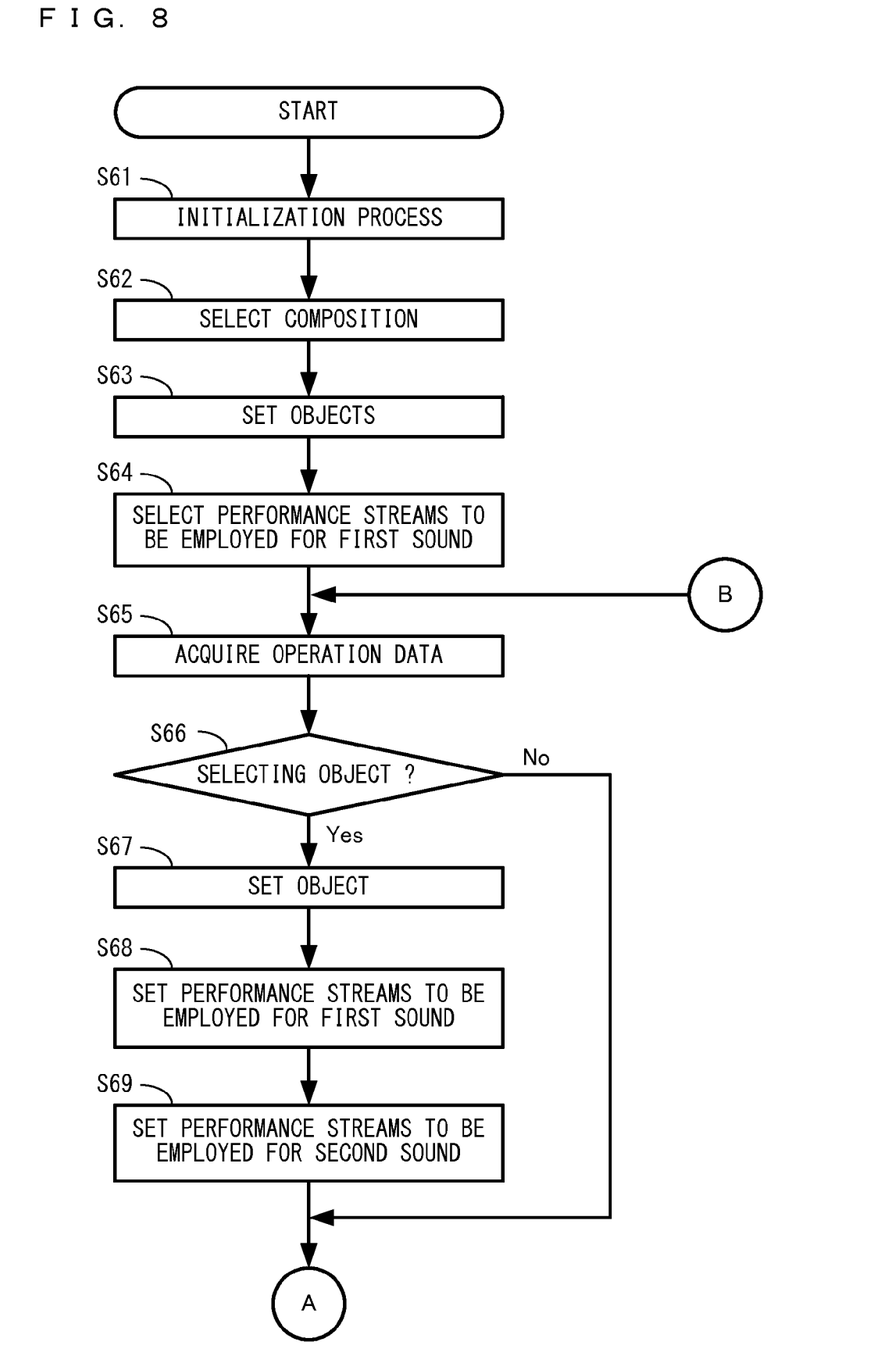
FIG. 8 is a flow chart showing a non-limiting example of the first half of the information processing performed by the information processing apparatus 3.
Figure 9:
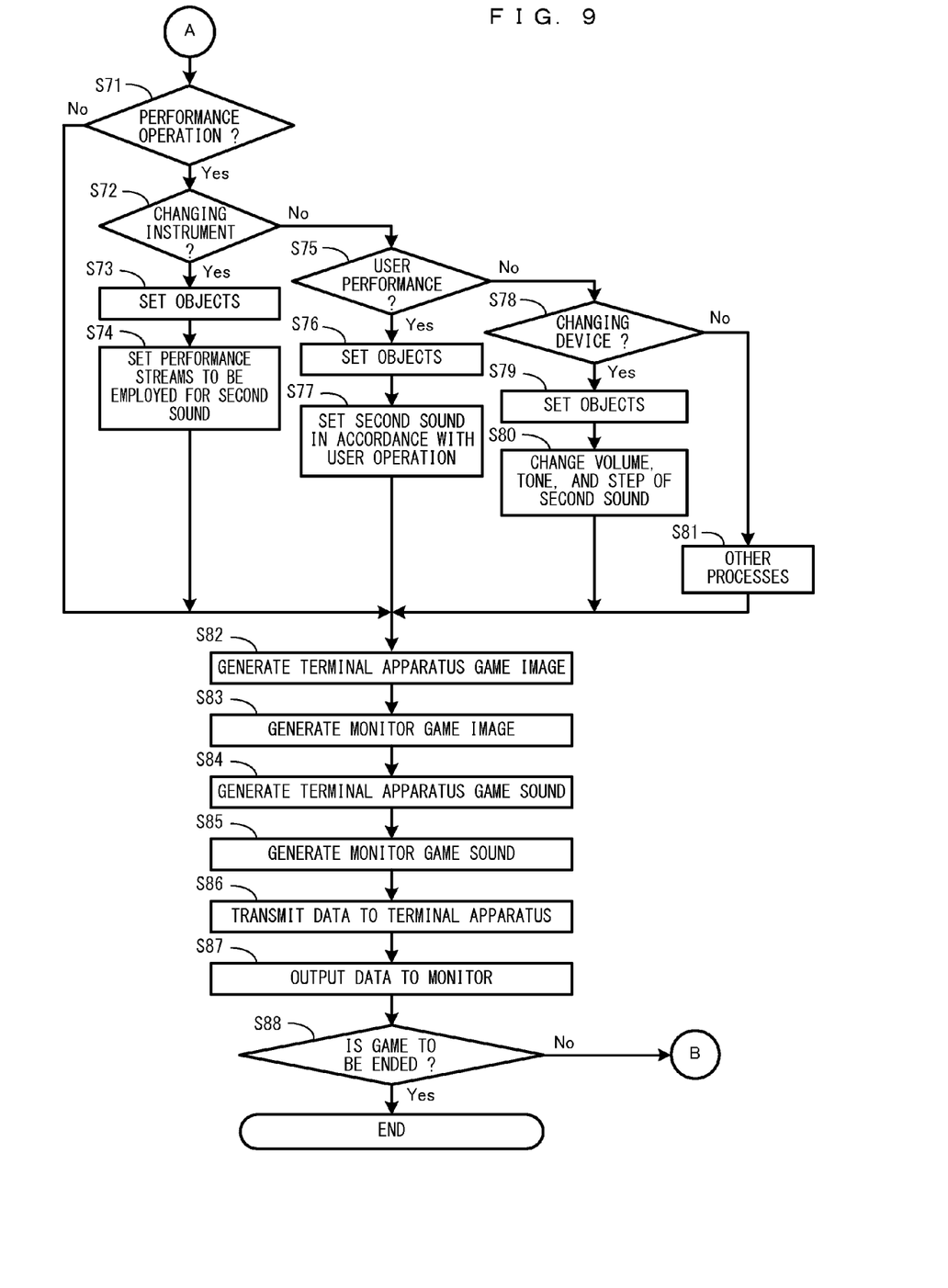
FIG. 9 is a flow chart showing a non-limiting example of the second half of the information processing performed by the information processing apparatus 3.

Next, with reference to FIGS. 8 and 9, detailed descriptions are given of the information processing performed by the information processing apparatus 3. It should be noted that FIG. 8 is a flow chart showing an example of the first half of the information processing performed by the information processing apparatus 3. FIG. 9 is a flow chart showing an example of the second half of the information processing performed by the information processing apparatus 3. Here, in the flow charts shown in FIGS. 8 and 9, descriptions are given mainly of, in the information processing performed by the information processing apparatus 3, the process of displaying objects on the terminal apparatus 2 and the monitor 4, and providing the audio output from each of the terminal apparatus 2 and the monitor 4. Detailed descriptions of other processes not directly related to these processes are omitted.

The CPU 5 initializes the memory 6 and the like, and loads the information processing program stored in a non-volatile memory or an optical disk included in the information processing apparatus 3 into the memory 6. Then, the CPU 5 starts the execution of the information processing program. The flow charts shown in FIGS. 8 and 9 are flow charts showing the processing performed after the above processes are completed.

It should be noted that the processes of all the steps in the flow chart shown in FIGS. 8 and 9 are merely illustrative. Thus, the processing order of the steps may be changed, or another process may be performed in addition to, and/or instead of, the processes of all the steps, so long as similar results are obtained. Further, in the exemplary embodiment, descriptions are given on the assumption that the CPU 5 performs the processes of all the steps in the flow chart. Alternatively, a processor or a dedicated circuit other than the CPU may perform the processes of some or all of the steps in the flow chart.

Referring to FIG. 8, the CPU 5 performs an initialization process (step 61), and proceeds to the subsequent step. For example, the CPU 5 constructs a virtual world in which a plurality of objects are to be placed and which is to be displayed on the monitor 4 in the following processes, and constructs a virtual world in which a selection object is to be placed and which is to be displayed on the terminal apparatus 2 in the following processes. Then, the CPU 5 initializes the parameters to be used in the game processing (for example, initializes the second sound data De so that the audio output of the second sound is not provided).

Next, the CPU 5 selects a composition to be performed in a game to be performed in the following processes (step 62), and proceeds to the subsequent step. For example, the CPU 5 selects a composition on the basis of a user operation or a predetermined algorithm, readies a plurality of performance streams (see FIG. 7) prepared for the composition, and stores the performance streams in the composition data Dc.

Next, the CPU 5 sets objects to perform the selected composition as an ensemble (step 63), and proceeds to the subsequent step. For example, the CPU 5 extracts a plurality of objects (a plurality of instruments) to perform the composition selected in the above step 62 as an ensemble. Then, the CPU 5 sets the positions where the plurality of respective extracted objects are to be displayed in the virtual world, and the instruments to be played by the plurality of respective extracted objects. Then, the CPU 5 stores data representing these settings in the display position data Db1 and the performance instrument data Db2 with respect to each of the plurality of objects.

Next, the CPU 5 selects performance streams to be employed for a first sound (step 64), and proceeds to the subsequent step. For example, the CPU 5 sets the stream numbers corresponding to the instruments to be played by the respective objects set in the above step 63, as the stream numbers of the performance streams of which the audio outputs are to be provided as the first sound. Then, the CPU 5 stores data representing these settings in the first sound data Dd. Further, the CPU 5 sets the performance parameters of each performance stream for specifying the steps, the tones, the volumes, and the like of the performance streams of which the audio outputs are to be provided as the first sound, and the performance timing of each performance stream, to the default. Then, the CPU 5 stores data representing these settings in the first sound data Dd.

Next, the CPU 5 acquires operation data from the terminal apparatus 2, updates the terminal operation data Da (step 65), and proceeds to the subsequent step. For example, the CPU 5 updates the operation input data Da1 using data representing the content of the operation on the operation section 13.

Next, the CPU 5 determines whether or not the operation data acquired in the above step 65 indicates the operation of selecting an object and moving the object to the virtual world displayed on the terminal apparatus 2 (step 66). Then, if the operation data indicates the operation of selecting an object and moving the object, the CPU 5 proceeds to step 67. If, on the other hand, the operation data does not indicate the operation of selecting an object and moving the object, the CPU 5 proceeds to step 71 (see FIG. 9).

In step 67, the CPU 5 sets objects on the basis of the operation data acquired in the above step 65, and proceeds to the subsequent step. For example, the CPU 5 extracts the selection object selected by the user, from among the plurality of objects displayed on the monitor 4. Then, the CPU 5 changes the display position of the extracted selection object to the inside of the virtual world displayed on the terminal apparatus 2 (for example, to such a position that the selection object is displayed at the center of the LCD 11), and updates the display position data Db1 of the selection object using the display position after the change.

Next, the CPU 5 sets performance streams to be employed for the first sound (step 68), and proceeds to the subsequent step. For example, the CPU 5 deletes the stream number corresponding to the instrument to be played by the selection object selected in the above steps 65 and 66, from the stream numbers of the performance streams of which the audio outputs are to be provided as the first sound. Then, the CPU 5 deletes the performance parameters and the performance timing set for the deleted stream number. Then, the CPU 5 updates the first sound data Dd. It should be noted that data representing the stream number, the performance parameters, and the performance timing deleted from the first sound data Dd in accordance with the movement of the selection object will move to the second sound data De through the process of step 69 described later.

Next, the CPU 5 sets performance streams to be employed for a second sound (step 69), and proceeds to step 71 (see FIG. 9). For example, the CPU 5 sets the stream number corresponding to the instrument to be played by the selection object selected in the above steps 65 and 66 (that is, the stream number deleted from the first sound data Dd in accordance with the movement of the selection object), as the stream number of the performance stream of which the audio output is to be provided as the second sound. Then, the CPU 5 stores data representing these settings in the second sound data De. Further, the CPU 5 sets the performance parameters of each performance stream for specifying the steps, the tones, the volumes, and the like of the performance streams of which the audio outputs are to be provided as the second sound, and the performance timing of each performance stream, to the state of the settings before the data has been deleted in the above step 68. Then, the CPU 5 stores data representing these settings in the second sound data De.

Referring next to FIG. 9, in step 71, the CPU 5 determines whether or not the operation data acquired in the above step 65 indicates a performance operation on the selection object. Here, the performance operation is the operation of controlling the state, the action, and the like of the selection object, and indicates, as a result, the operation of changing the volume, the tone, the step, the number of produced sounds, and the like of the sound of which the audio output is to be provided from the loudspeaker 12 of the terminal apparatus 2. Then, if the operation data indicates a performance operation, the CPU 5 proceeds to step 72. If, on the other hand, the operation data does not indicate a performance operation, the CPU 5 proceeds to step 82.

In step 72, the CPU 5 determines whether or not the operation data acquired in the above step 65 indicates the operation of changing the instrument to be played by the selection object. Then, if the operation data indicates the operation of changing the instrument, the CPU 5 proceeds to step 73. If, on the other hand, the operation data does not indicate the operation of changing the instrument, the CPU 5 proceeds to step 75.

In step 73, the CPU 5 sets objects on the basis of the operation data acquired in the above step 65, and proceeds to the subsequent step. For example, on the basis of the operation data, the CPU 5 changes the instrument to be played by the selection object, and updates the performance instrument data Db2 of the selection object in accordance with the instrument after the change.

Next, the CPU 5 sets performance streams to be employed for the second sound (step 74), and proceeds to step 82. For example, on the basis of the change of instruments in the above step 73, the CPU 5 sets the stream number corresponding to the instrument after the change, as the stream number of the performance stream of which the audio output is to be provided as the second sound, so as to replace the stream number corresponding to the instrument before the change. Then, the CPU 5 updates the second sound data De. Further, the CPU 5 sets the performance parameters of each performance stream for specifying the steps, the tones, the volumes, and the like of the performance streams of which the audio outputs are to be provided as the second sound, to the default or to the settings before the change of instruments. Then, the CPU 5 also sets the performance timing of the performance stream corresponding to the stream number after the change to the performance timing set before the change of instruments. Then, the CPU 5 updates the second sound data De.

In step 75, the CPU 5 determines whether or not the operation data acquired in the above step 65 indicates the operation of giving a user performance. Then, if the operation data indicates the operation of giving a user performance, the CPU 5 proceeds to step 76. If, on the other hand, the operation data does not indicate the operation of giving a user performance, the CPU 5 proceeds to step 78.

In step 76, the CPU 5 sets objects on the basis of the operation data acquired in the above step 65, and proceeds to the subsequent step. For example, on the basis of the operation data, the CPU 5 controls the action of the selection object playing the instrument.

Next, the CPU 5 generates the second sound in accordance with a user operation (step 77), and proceeds to step 82. As a first example, if the difference between the time when the operation section 13 has been operated (for example, the time when the operation button has been pressed) and the time when the production of the sound starts in the performance stream corresponding to the instrument played by the selection object is within a predetermined time difference, the CPU 5 sets a sound based on the performance stream as the second sound, and updates the second sound data De. As a second example, the CPU 5 sets a sound set in accordance with an operation on the operation section 13 (for example, a sound having the step set at the position, in the virtual world, overlapping a touch position on the touch panel, and also having the timbre of the instrument played by the selection object), as the second sound, and updates the second sound data De. It should be noted that in another example, the generation of the second sound based on a user operation may be performed using another method.

In step 78, the CPU 5 determines whether or not the operation data acquired in the above step 65 indicates the operation of changing the device for adding a sound effect to playing or singing. Then, if the operation data indicates the user operation of changing the device, the CPU 5 proceeds to step 79. If, on the other hand, the operation data does not indicate the user operation of changing the device, the CPU 5 proceeds to step 81.

In step 79, the CPU 5 sets objects on the basis of the operation data acquired in the above step 65, and proceeds to the subsequent step. For example, the CPU 5 changes the device on the basis of the operation data, and updates the performance instrument data Db2 of the selection object in accordance with the device after the change.

Next, the CPU 5 changes the volume, the tone, the step, and the like of the second sound in accordance with a user operation (step 80), and proceeds to step 82. For example, in accordance with the change of performance methods (the change of the device for adding a sound effect to playing or singing) made in the above step 79, the CPU 5 changes the performance parameters for specifying the steps, the tones, the volumes, and the like of the performance streams of which the audio outputs are to be provided as the second sound. Then, the CPU 5 updates the second sound data De using the performance parameters after the changes.

In step 81, the CPU 5 performs other processes on the basis of the operation data acquired in the above step 65, and proceeds to step 82. Here, the other processes refer to processes different from the processes corresponding to the performance operation performed in the above steps 72 through 80, and include the process of controlling the state, the action, and the like of the selection object on the basis of the operation data, and changing the volume, the tone, the step, the number of produced sounds, and the like of the second sound.

Then, also in the other processes, the CPU 5 updates the object data Db and the second sound data De on the basis of the operation data.

In step 82, the CPU 5 generates a terminal apparatus game image to be displayed on the terminal apparatus 2, and proceeds to the subsequent step. For example, the CPU 5 reads, from the memory 6, data indicating the results of the game processing performed in the above steps 61 through 81, and reads, from a VRAM (video RAM) or the like, data necessary for generating a terminal apparatus game image. Then, the CPU 5 generates a terminal apparatus game image using the read data, and stores the generated terminal apparatus game image in the VRAM. As an example, the terminal apparatus game image may be generated as a three-dimensional CG image by: placing the objects in the virtual world to be displayed on the terminal apparatus 2 on the basis of the object data Db; and calculating the virtual world viewed from a predetermined virtual camera.

Next, the CPU 5 generates a monitor game image to be displayed on the monitor 4 (step 83), and proceeds to the subsequent step. For example, the CPU 5 reads, from the memory 6, data indicating the results of the game processing performed in the above steps 61 through 81, and reads, from the VRAM or the like, data necessary for generating a monitor game image. Then, the CPU 5 generates a monitor game image using the read data, and stores the generated monitor game image in the VRAM. As an example, the monitor game image may be generated as a three-dimensional CG image by: placing the objects in the virtual world to be displayed on the monitor 4 on the basis of the object data Db; and calculating the virtual world viewed from a predetermined virtual camera.

Next, the CPU 5 generates a terminal apparatus game sound to be output to the loudspeaker 12 of the terminal apparatus 2 (step 84), and proceeds to the subsequent step. For example, with reference to the second sound data De, the CPU 5 sets the stream numbers, the performance parameters, and the performance timing of the performance streams of which the audio outputs are to be provided. Then, on the basis of the set performance parameters and performance timing, the CPU 5 superimposes the performance streams corresponding to the set stream numbers as performance targets to generate a terminal apparatus game sound. Specifically, on the basis of the performance parameters, the CPU 5 adjusts the performance volumes, the performance tones, the performance steps, and the like of the performance streams corresponding to the set stream numbers, and superimposes the performance streams to generate a terminal apparatus game sound.

Next, the CPU 5 generates a monitor game sound to be output to the loudspeaker 41 of the monitor 4 (step 85), and proceeds to the subsequent step. For example, with reference to the first sound data Dd, the CPU 5 sets the stream numbers, the performance parameters, and the performance timing of the performance streams of which the audio outputs are to be provided. Then, on the basis of the set stream numbers, performance parameters, and performance timing, the CPU 5 superimposes the performance streams similarly to the above step 84 to generate a monitor game sound.

Next, the CPU 5 transmits the terminal apparatus game image and the terminal apparatus game sound to the terminal apparatus 2 (step 86), and proceeds to the subsequent step. For example, the terminal apparatus game image is received by the terminal apparatus 2, and is output to and displayed on the LCD 11. Further, the terminal apparatus game sound is received by the terminal apparatus 2, and is output from the loudspeaker 12. It should be noted that the terminal apparatus game image may be subjected to a predetermined compression process when transmitted from the information processing apparatus 3 to the terminal apparatus 2. In this case, data of the terminal apparatus game image subjected to the compression process is sent to the terminal apparatus 2, and is subjected to a predetermined decompression process by the terminal apparatus 2. Thereafter, the terminal apparatus game image is displayed.

Next, the CPU 5 outputs the monitor game image and the monitor game sound to the monitor 4 (step 87), and proceeds to the subsequent step. For example, the monitor game image is acquired by the monitor 4, and is output to and displayed on the display screen of the monitor 4. Further, the monitor game sound is acquired by the monitor 4, and is output from the loudspeaker 41.

Next, the CPU 5 determines whether or not the game is to be ended (step 88). Examples of conditions for ending the game include: the satisfaction of the conditions under which the game is over or the game is completed; and the fact that the user has performed the operation of ending the game. If the game is not to be ended, the CPU 5 returns to the above step 65, and repeats the process thereof. If the game is to be ended, the CPU 5 ends the processing indicated in the flow chart. Thereafter, the CPU 5 repeatedly performs a series of processes of steps 65 through 88 until it is determined in step 88 that the game is to be ended.

It should be noted that in the above exemplary embodiment, the information processing system 1 includes only one terminal apparatus 2. Alternatively, the information processing system 1 may be configured to include a plurality of terminal apparatuses 2. That is, the information processing apparatus 3 may be capable of wirelessly communicating with each of the plurality of terminal apparatuses 2, and may transmit image data and sound data to the terminal apparatus 2 and receive terminal operation data from the terminal apparatus 2. Then, a selection object selected by each terminal apparatus 2 may be displayed on the LCD 11 of the terminal apparatus 2, and a selection sound corresponding to the selection object may be output from the loudspeaker 12 of the terminal apparatus 2. When the information processing apparatus 3 wirelessly communicates with each of the plurality of terminal apparatuses 2, the information processing apparatus 3 may perform the wireless communication with the terminal apparatus 2 in a time division manner or in a frequency division manner.

In addition, the terminal apparatus 2 described above functions as a so-called thin client terminal, which does not perform the series of processes described with reference to FIGS. 8 and 9 or the information processing performed by the information processing apparatus 3. For example, if information processing is executed by a plurality of information processing apparatuses, it is necessary to synchronize the processing executed by the information processing apparatuses, which complicates the processing. In contrast, as in the above exemplary embodiment, if information processing is executed by one information processing apparatus 3, and the terminal apparatus 2 receives and displays an image (that is, if the terminal apparatus 2 is a thin client terminal), it is not necessary to synchronize the processing among a plurality of information processing apparatuses, which can simplify the processing. The terminal apparatus 2, however, may be an apparatus having the function of performing predetermined information processing by a predetermined program (an information processing program), such as a handheld game apparatus. In this case, in the above exemplary embodiment, at least some of the series of processes to be performed by the information processing apparatus 3 may be performed by the terminal apparatus 2. As an example, if a game image is displayed on each of a plurality of terminal apparatus, using at least one terminal apparatus capable of executing all of the series of processes described above, one of the terminal apparatuses capable of executing all of the series of processes serves as a main process execution apparatus that executes the series of processes, so that the main process execution apparatus transmits game images based on the orientations of and operations on the other terminal apparatuses to the other terminal apparatuses. This makes it possible to output a similar game image to each of the terminal apparatuses and display the game image on the terminal apparatus.

It should be noted that the above descriptions are given using the example where the information processing apparatus 3 performs the information processing processing. Alternatively, another apparatus other than the terminal apparatus 2 may perform at least some of the processing steps in the processing. For example, if the information processing apparatus 3 is further configured to communicate with another apparatus other than the terminal apparatus 2 (for example, another server, another game apparatus, or another mobile terminal), the other apparatus may cooperate to perform the processing steps in the processing. As an example, the other apparatus may generate a virtual world and a sound and perform the game processing using the virtual world, and the result of the game processing may be displayed on the terminal apparatus 2 and the monitor 4. Another apparatus may thus perform at least some of the processing steps in the processing, which enables processing similar to that described above. Further, the processing described above can be performed by a processor or the cooperation of a plurality of processors, the processor and the plurality of processors contained in an information processing system including at least one information processing apparatus. Further, in the exemplary embodiment, the processing indicated in the flow chart described above is performed by the CPU 5 of the information processing apparatus 3 executing a predetermined game program. Alternatively, some or all of the game processing indicated in the flow chart may be performed by a dedicated circuit included in the information processing apparatus 3.

Here, the above variations make it possible to achieve the exemplary embodiment also by a system form such as cloud computing, or a system form such as a distributed wide area network or a local area network. For example, in a system form such as a distributed local area network, it is possible to execute the processing between a stationary information processing apparatus (a stationary game apparatus) and a handheld information processing apparatus (a handheld game apparatus) by the cooperation of the apparatuses. It should be noted that, in these system forms, there is no particular limitation on which apparatus performs the process of each step of the processing described above. Thus, it goes without saying that it is possible to achieve the exemplary embodiment by sharing the processing in any manner.

In addition, the processing orders, the setting values, the conditions used in the determinations, and the like that are used in the game processing described above are merely illustrative. Thus, it goes without saying that the exemplary embodiment can be achieved also with other orders, other values, and other conditions.

In addition, the program may be supplied to the information processing apparatus 3 not only through an external storage medium such as the external memory 45, but also through a wired or wireless communication link. Further, the program may be stored in advance in a non-volatile storage device included in the information processing apparatus 3. It should be noted that examples of an information storage medium having stored therein the program may include CD-ROMs, DVDs, optical disk storage media similar to these, flexible disks, hard disks, magneto-optical disks, and magnetic tapes, as well as non-volatile memories. Alternatively, an information storage medium having stored therein the program may be a volatile memory for storing the program. It can be said that such a storage medium is a storage medium readable by a computer or the like. For example, it is possible to provide the various functions described above by causing a computer or the like to load a program from the storage medium and execute it.

The systems, devices and apparatuses described herein may include one or more processors, which may be located in one place or distributed in a variety of places communicating via one or more networks. Such processor(s) can, for example, use conventional 3D graphics transformations, virtual camera and other techniques to provide appropriate images for display. By way of example and without limitation, the processors can be any of: a processor that is part of or is a separate component co-located with the stationary display and which communicates remotely (e.g., wirelessly) with the movable display; or a processor that is part of or is a separate component co-located with the movable display and communicates remotely (e.g., wirelessly) with the stationary display or associated equipment; or a distributed processing arrangement some of which is contained within the movable display housing and some of which is co-located with the stationary display, the distributed portions communicating together via a connection such as a wireless or wired network; or a processor(s) located remotely (e.g., in the cloud) from both the stationary and movable displays and communicating with each of them via one or more network connections; or any combination or variation of the above.

The processors can be implemented using one or more general-purpose processors, one or more specialized graphics processors, or combinations of these. These may be supplemented by specifically-designed ASICs (application specific integrated circuits) and/or logic circuitry. In the case of a distributed processor architecture or arrangement, appropriate data exchange and transmission protocols are used to provide low latency and maintain interactivity, as will be understood by those skilled in the art.

Similarly, program instructions, data and other information for implementing the systems and methods described herein may be stored in one or more on-board and/or removable memory devices. Multiple memory devices may be part of the same device or different devices, which are co-located or remotely located with respect to each other.

While some exemplary systems, exemplary methods, exemplary devices, and exemplary apparatuses have been described in detail above, the above descriptions are merely illustrative in all respects, and do not limit the scope of the systems, the methods, the devices, and the apparatuses. It goes without saying that the systems, the methods, the devices, and the apparatuses can be improved and modified in various manners without departing the spirit and scope of the appended claims. It is understood that the scope of the systems, the methods, the devices, and the apparatuses should be interpreted only by the scope of the appended claims. Further, it is understood that the specific descriptions of the exemplary embodiment enable a person skilled in the art to carry out an equivalent scope on the basis of the descriptions of the exemplary embodiment and general technical knowledge. It should be understood that, when used in the specification, the components and the like described in the singular with the word "a" or "an" preceding them do not exclude the plurals of the components. Furthermore, it should be understood that, unless otherwise stated, the terms used in the specification are used in their common meanings in the field. Thus, unless otherwise defined, all the jargons and the technical terms used in the specification have the same meanings as those generally understood by a person skilled in the art in the field of the exemplary embodiment. If there is a conflict, the specification (including definitions) takes precedence.

As described above, the exemplary embodiment is useful as, for example, an information processing program, an information processing apparatus, an information processing system, and an information processing method in order, for example, to obtain a wide variety of sound outputs.

What is claimed is:

1. A non-transitory computer-readable storage medium having stored therein an information processing program to be executed by a computer of an information processing apparatus that is coupled to a first display apparatus, a first loudspeaker, and another apparatus having a second loudspeaker, the information processing program causing the computer to execute:
generating, as a first display image, an image of at least a part of a virtual world;
generating a first sound that is associated with the virtual world;
selecting, in accordance with a user operation, a second sound that is less than all of the first sound;
performing control such that the first display image is displayed on the first display apparatus;
performing control such that the generated first sound is output from the first loudspeaker in synchronization with the first display image displayed on the first display apparatus; and
performing control such that the selected second sound is output, from the second loudspeaker, concurrently with the output of first sound and the display of the first display image, where other parts of the first sound not included in the second sound are not outputted by the second loudspeaker,
in the generation of the first sound, if the second sound has been selected, the first sound is newly generated by removing the second sound from the first sound and the first sound that is output from the first loudspeaker is the newly generated first sound.

2. The non-transitory computer-readable storage medium having stored therein the information processing program according to claim 1, wherein
in the generation of the first display image, an image in which a plurality of objects are placed in the virtual world is generated as the first display image,
the information processing program further causing the computer to execute
selecting at least one object from among the plurality of objects in accordance with a user operation, wherein
in the generation of the first sound, the first sound is generated in accordance with the objects displayed as the first display image; and
in the selection of the second sound, the second sound is selected in accordance with the at least one selected object.

3. The non-transitory computer-readable storage medium having stored therein the information processing program according to claim 2, wherein
in the generation of the first display image, an image obtained by removing the at least one selected object from the plurality of objects and placing the at least one remaining object is generated as the first display image; and
in the generation of the first sound, a second sound based on the at least one selected object is removed from the first sound based on the plurality of objects to newly generate a sound based on the at least one remaining object as the first sound and the newly generated sound is output from the first loudspeaker.

4. The non-transitory computer-readable storage medium having stored therein the information processing program according to claim 2, wherein
the another apparatus is a second display apparatus having a display screen,
the information processing program further causing the computer to execute:
generating an image representing the at least one selected object, as a second display image; and
performing control such that the second display image is displayed on the second display apparatus, wherein
in the selection of the second sound, the second sound is selected in accordance with the at least one object displayed as the second display image.

5. The non-transitory computer-readable storage medium having stored therein the information processing program according to claim 4, wherein
in the generation of the first sound, a sound of which a sound source is the at least one object displayed as the first display image is generated as the first sound; and
in the selection of the second sound, a sound of which a sound source is the at least one object displayed as the second display image is selected as the second sound.

6. The non-transitory computer-readable storage medium having stored therein the information processing program according to claim 4, wherein
the first display apparatus is a stationary display apparatus; and
the second display apparatus is a portable display apparatus.

7. The non-transitory computer-readable storage medium having stored therein the information processing program according to claim 4, wherein
the second display apparatus includes an operation input unit configured to output data based on a user operation input,
the information processing program further causing the computer to execute:
acquiring the data output from the operation input unit;
controlling, in accordance with the acquired data, the at least one object displayed as the second display image; and
changing, in accordance with the acquired data, at least one of a volume, a tone, a step, and the number of produced sounds of the second sound.

8. The non-transitory computer-readable storage medium having stored therein the information processing program according to claim 1, wherein
in the generation of the first sound, a sound of performing one composition as an ensemble using a plurality of instruments in the virtual world is generated as the first sound;
in the selection of the second sound, a sound of performing the composition with at least one instrument selected from among the plurality of instruments in accordance with a user operation is generated as the second sound; and in the control of outputting the second sound, the second sound of performing the composition is output from the second loudspeaker in synchronization with the performance of the composition output as the first sound from the first loudspeaker.

9. The non-transitory computer-readable storage medium having stored therein the information processing program according to claim 1, the information processing program further causing the computer to execute
determining, in accordance with a user operation, a position and/or a direction indicated in the virtual world displayed as the first display image, wherein
in the generation of the first sound, an entire sound created in an entirety of the virtual world displayed as the first display image is generated as the first sound; and
in the selection of the second sound, on the basis of the position and/or the direction indicated in the virtual world, a sound created in a periphery of the position indicated in the virtual world and/or a sound created in a predetermined range with respect to the direction indicated in the virtual world is generated and selected as the second sound.

10. An information processing apparatus coupled to a first display apparatus, a first loudspeaker, and another apparatus that includes a second loudspeaker, the information processing apparatus comprising:
a processing system that includes at least one hardware processor, the processing system configured to:
generate an image of a view of at least a part of a virtual world as a first display image;
generate a first sound that is created in association with the virtual world;
select, in accordance with a user operation, a second sound that forms a part of the first sound;
output, to the first display apparatus, the first image;
output, to the first loudspeaker and in synchronization with the first display image being displayed on the first display apparatus, audio that is based on the generated first sound; and
output, to the second loudspeaker, the selected second sound concurrently with the first sound being output and the first display image being output, where other parts of the first sound not included in the second sound are not outputted by the second loudspeaker,
in the generation of the first sound, if the second sound has been selected, the first sound is newly generated by removing the second sound from the first sound and the first sound that is output from the first loudspeaker is the newly generated first sound.

11. An information processing system comprising:
a first display apparatus;
a first loudspeaker;
a computing apparatus that includes a second loudspeaker that is different from the first loudspeaker; and
at least one hardware processor that is configured to communicate with the computing apparatus, the at least one hardware processor configured to:
generate a first display image of at least a part of a virtual world;
generate a first sound that is associated with the virtual world;
select, in accordance with a user operation, a second sound that forms a part of the first sound;
based on selection of the second sound that forms part of the first sound, regenerate the first sound by removing the second sound from the first sound,
perform control such that the first display image is displayed on the first display apparatus;
perform control such that the regenerated first sound is output from the first loudspeaker in synchronization with the first display image being displayed on the first display apparatus; and
perform control such that the second sound is output from the second loudspeaker concurrently with the regenerated sound and the first display image, where other parts of the first sound not included in the second sound are not output by the second loudspeaker.

12. An information processing method to be executed by a processing system that includes at least one hardware processor coupled to a first display apparatus, a first loudspeaker, and another apparatus having a second loudspeaker, the information processing method comprising:
generating a first display image of at least a part of a virtual world;
generating a first sound that is associated with the virtual world;
selecting, in accordance with a user operation, a second sound that is less than all of the first sound;
performing control such that the first display image is displayed on the first display apparatus;
performing control such that the generated first sound is output from the first loudspeaker in synchronization with the first display image displayed on the first display apparatus;
in accordance with selection of the second sound, generating a third sound by removing the second sound from the first sound and performing control such that the generated third sound is output from the first loudspeaker in synchronization with corresponding images displayed on the first display apparatus; and
performing control such that the selected second sound is output from the second loudspeaker concurrently with the output of the third sound and the display of the corresponding images, where parts of the third sound that are not included in the second sound are not controlled to be outputted by the second loudspeaker.

13. The information processing system of claim 11, wherein the computing apparatus is a portable computing apparatus with the second loudspeaker integrated into a body of the portable computing apparatus, the portable computing apparatus including a transceiver configured to wirelessly communicate with the at least one hardware processor to thereby receive sound data that is output as the second sound from the second loudspeaker.

14. The information processing apparatus of claim 10, wherein the another apparatus is a portable computing apparatus with the second loudspeaker integrated into a body of the portable computing apparatus, the portable computing apparatus including a transceiver configured to wirelessly communicate with the processing system to thereby receive sound data that is output as the second sound from the second loudspeaker.

15. The non-transitory computer-readable storage medium of claim 1, wherein the another apparatus is a mobile computing apparatus with the second loudspeaker integrated into a body of the mobile computing apparatus, the mobile computing apparatus including a transceiver configured to wirelessly communicate with the information processing apparatus to thereby receive sound data that is output as the second sound from the second loudspeaker.

* * * * *